Feb. 26, 1952 W. MOERMAN 2,587,195
METHOD OF ELECTRIC ARC WELDING
Filed Feb. 17, 1949
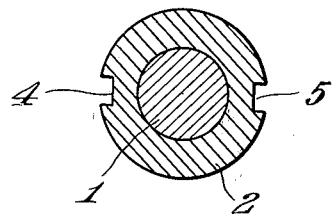
Fig. 1.
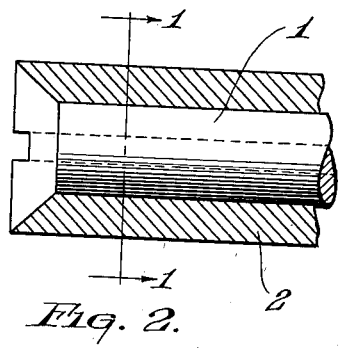
Fig. 2.
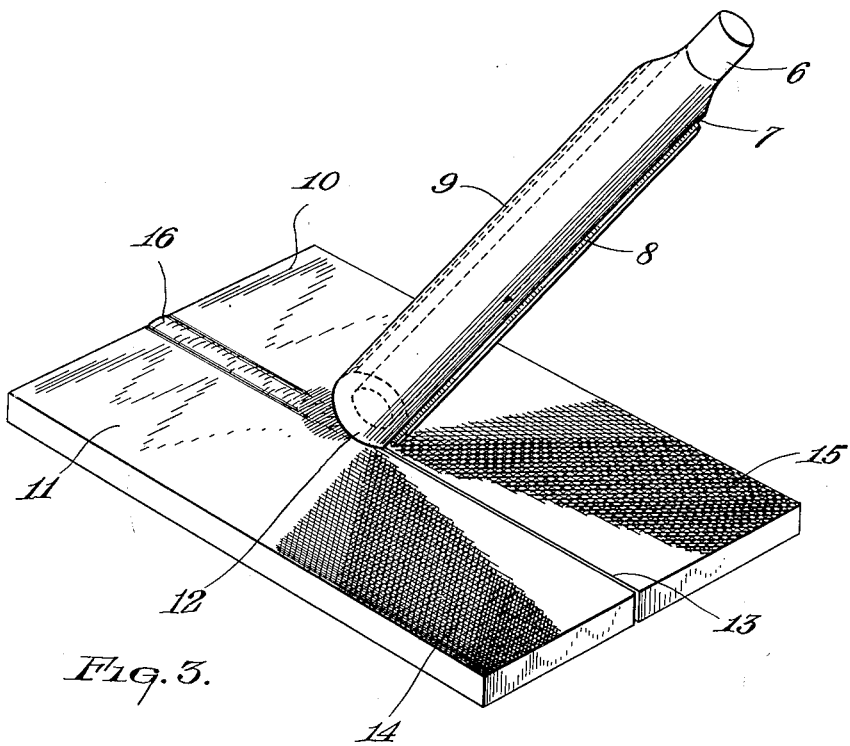
Fig. 3.
INVENTOR.
WILLEM MOERMAN.
BY
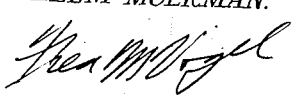
AGENT.

Patented Feb. 26, 1952

2,587,195

UNITED STATES PATENT OFFICE 2,587,195

METHOD OF ELECTRIC ARC WELDING

Willem Moerman, Eindhoven, Netherlands, assignor to Hartford National Bank and Trust Company, Hartford, Conn., as trustee Application February 17, 1949, Serial No. 76,928
In the Netherlands April 17, 1948

1 Claim. (Cl. 219—10)

The invention relates to a method of electric arc welding and to a coated welding rod for use therein.

According to the invention use is made of a coated welding rod which comprises a longitudinal slot and during the welding operation is positioned in such manner that this slot faces the work-piece.

In arc welding with the use of a coated welding rod, a troublesome shadow may be produced on the path to be traversed, if a very short arc length is employed. The invention offers the advantage that such a troublesome shadow does not occur, since the slot provided in the coating in accordance with the invention enables the light of the arc sufficiently to illuminate also the path still required to be traversed.

The invention is of particular utility for electric arc-welding by touch-welding and dispenses with the use of a guide for following the desired path. It is known that for arc touch-welding use is normally made of comparatively thickly coated welding rods, which, but for the invention, is liable to contribute to the formation of a troublesome shadow. A slot according to the invention may be formed comparatively readily, particularly in such a thick coating.

It is essentially possible to provide several slots according to the invention and this enhances ease of manipulation, since it is not necessary to meet considerations of one definite position of the welding rod. However, it will be preferred to restrict the number of slots to two slots, preferably facing one another.

In choosing the size of the slot, it is advisable to make provision to see that the width and depth of the slot are not such as to entail difficulty in touch-welding. When using an excessively wide slot, so-called freezing-on is liable to occur, since the distance from the core to the work-piece becomes excessively small. Excessive depth of the groove may entail so-called crooked burning, since the arc is formed in a not altogether desirable direction. Accordingly, it will be preferred to arrange for the slot to be not so deep as to reach the core of the welding rod.

With a coated welding rod the core of which has a diameter of 4 mm. and the coating of which has an external diameter of 7 mm., a width of about 1 mm. and a depth of 0.4 mm. have proved to be suitable dimensions. A further example is a coated welding rod having a core diameter of 3.25 mm. and a coating diameter of 5.8 mm., in which provision is made of one or more slots having a width of 0.8 mm. and a depth of 0.3 mm.

It may be observed that in general the tolerance of the dimensions of a slot according to the invention in view of the said phenomena of freezing-on and crooked burning is comparatively small. This is particularly important for welding rods of comparatively small diameters, with which the dimensions of the slot are required to be correspondingly small. In the case of larger diameters it is preferable to desire larger dimensions of a slot according to the invention in order to intensify as far as possible the illumination of the path to be traversed, sought by the invention.

In order that the invention may be more clearly understood and readily carried into effect, it will now be described more fully with reference to the accompanying drawing, in which Figure 1 is a cross-sectional view taken along the line 1—1 of Figure 2.

Figure 2 is a longitudinal sectional view of a welding rod according to the invention, and Figure 3 is a perspective view of the welding rod according to the invention as being applied to a welding plate.

As shown in Figures 1 and 2, the coated welding rod comprises a metal core indicated at 1, a coating 2 and two slits 4 and 5.

Fig. 3 illustrates how welding may be performed with the use of a coated welding rod according to the invention, 6 designating the core, 7 the coating, 8 and 9 the slots in a coated welding rod according to the invention with the use of which work-pieces 10 and 11 are required to be welded together. Through the slot 8 facing the work-piece the light of arc 12 illuminates the path 13 in which the weld is required to be made; 14 and 15 designate the shadows produced by the welding rod on the work-pieces to be welded together and 16 designates the completed weld with the slag lying on it.

What I claim is:

A method of electric arc-welding with a touch welding rod having a core and a coating thereon, said coating having a substantially longitudinal slot therein which does not extend inwardly to said core thereof, said coating melting more rapidly than said core during welding to form a crater at the arc end; which comprises the steps of keeping an edge of the coating of the touch welding rod in abutment with the metallic work-piece to be welded while initiating a welding arc between said rod and work-piece, with said edge of said coating in continuous abutment with said work-piece and then moving said rod along the path of the weld to be made in the work-piece, with said edge of said coating in continuous abutment with said work-piece and at an angle thereto, with the portion of the slot in the region of the abutment between said rod and said work-piece facing said welding path and said arc continuously laterally confined in said crater, whereby light from said arc escapes via said groove to illuminate said work-piece in the region thereof where the weld is yet to be made.

WILLEM MOERMAN.

REFERENCES CITED

The following references are of record in the file of this patent:

UNITED STATES PATENTS

| Number | Name | Date |
|---|---|---|
| 867,659 | Hoopes et al. | Oct. 8, 1907 |
| 1,441,685 | Jones | Jan. 9, 1923 |
| 1,993,852 | Miller | Mar. 12, 1935 |

FOREIGN PATENTS

| Number | Country | Date |
|---|---|---|
| 5,184 | Australia | Dec. 13, 1926 |
| 878,797 | France | Jan. 29, 1943 |

OTHER REFERENCES

"Welding Journal," May 1946, pages 313–316 (Supplement).